United States Patent
Bossemeyer, Jr. et al.

(10) Patent No.: US 7,283,807 B2
(45) Date of Patent: *Oct. 16, 2007

(54) METHOD AND TELECOMMUNICATION SYSTEM FOR INDICATING THE RECEIPT OF A DATA MESSAGE

(75) Inventors: Robert Wesley Bossemeyer, Jr., St. Charles, IL (US); Bruce Edward Stuckman, Algonquin, IL (US); Crystal Roney, River Forest, IL (US); Neil Eugene Cox, South Barrington, IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/336,633

(22) Filed: Jan. 19, 2006

(65) Prior Publication Data

US 2006/0194571 A1 Aug. 31, 2006

Related U.S. Application Data

(63) Continuation of application No. 10/267,552, filed on Oct. 8, 2002, now Pat. No. 7,020,458, which is a continuation of application No. 09/166,878, filed on Oct. 6, 1998, now Pat. No. 6,490,444.

(51) Int. Cl.
*H04Q 7/20* (2006.01)
(52) U.S. Cl. .................... 455/412.2; 455/466
(58) Field of Classification Search ............ 455/412.1, 455/412.2, 413, 414.1–414.4, 432.3, 433, 455/466, 517, 556.1–556.2, 557, 567
See application file for complete search history.

(56) References Cited

U.S. PATENT DOCUMENTS

| | | | |
|---|---|---|---|
| 5,138,653 A | 8/1992 | Le Clereg | 379/93.24 |
| 5,293,250 A | 3/1994 | Okumura et al. | 358/402 |
| 5,313,515 A | 5/1994 | Allen et al. | 455/413 |
| 5,475,737 A | 12/1995 | Garner et al. | 379/88.26 |
| 5,479,408 A | 12/1995 | Will | 370/313 |
| 5,500,893 A | 3/1996 | Onosaka | 379/396 |
| 5,548,753 A | 8/1996 | Linstead et al. | 707/1 |
| 5,561,703 A | 10/1996 | Arledge et al. | 455/556.1 X |
| 5,588,009 A | 12/1996 | Will | 714/749 |
| 5,619,648 A | 4/1997 | Canale et al. | 709/206 |
| 5,628,051 A | 5/1997 | Salin | 455/433 |
| 5,675,507 A | 10/1997 | Bobo, II | 709/206 |
| 5,751,707 A | 5/1998 | Voit et al. | 370/384 |
| 5,799,060 A | 8/1998 | Kennedy et al. | 379/29.05 |

(Continued)

*Primary Examiner*—Philip J. Sobutka
(74) *Attorney, Agent, or Firm*—Brinks Hofer Gilson & Lione

(57) ABSTRACT

The method operates in a telecommunications network having at least one subscriber terminal corresponding to at least one subscriber at a subscriber location. The method implements a message waiting indication service for indicating the presence of a data message corresponding to the at least one subscriber in a data message platform. The method begins in step 100 by receiving the data message at the data message platform. A message waiting signal is generated as shown in step 102. The message waiting signal is transmitted to the telecommunications network as shown in step 104 and a message waiting indication signal is generated at the telecommunications network as shown in step 106. Finally, a message waiting indication signal is transmitted to the subscriber terminal in response to the message waiting signal.

31 Claims, 8 Drawing Sheets

U.S. PATENT DOCUMENTS

| | | | |
|---|---|---|---|
| 5,889,839 A | 3/1999 | Beyda et al. | 379/88.12 |
| 5,909,647 A | 6/1999 | Hashimoto et al. | 455/412.2 |
| 6,002,750 A | 12/1999 | Ertz | 379/88.12 |
| 6,014,559 A | 1/2000 | Amin | 455/413 |
| 6,058,303 A | 5/2000 | Åström et al. | 455/413 |
| 6,128,489 A | 10/2000 | Seazholtz et al. | 455/432.1 |
| 6,175,743 B1 | 1/2001 | Alperovich et al. | 455/466 |
| 6,215,859 B1 | 4/2001 | Hanson | 379/88.22 |
| 6,237,027 B1 | 5/2001 | Namekawa | 455/412.1 X |
| 6,490,444 B1 | 12/2002 | Bossemeyer et al. | 455/412.2 |
| 6,630,883 B1 | 10/2003 | Amin et al. | 340/7.29 |
| 7,020,458 B2 * | 3/2006 | Bossemeyer et al. | 455/412.2 |

* cited by examiner

METHOD AND TELECOMMUNICATION SYSTEM FOR INDICATING THE RECEIPT OF A DATA MESSAGE

PRIORITY CLAIM

The present application claims priority as a continuation to U.S. patent application Ser. No. 10/267,552, filed Oct. 8, 2002 now U.S. Pat. No. 7,020,458, which is a continuation of Ser. No. 09/166,878, filed Oct. 6, 1998, now issued as U.S. Pat. No. 6,490,444 B1 incorporated in their entirely by reference herein.

TECHNICAL FIELD

The present invention relates to telecommunication systems and email systems, and in particular to systems and methods for providing message notification.

BACKGROUND ART

Many users currently avail themselves of email messaging services that allow these users to send, store and receive email messages quickly and efficiently to other users around the world. While these services originated in the context of business information networks, many users now have access to such services via home computers, the Internet and the World Wide Web. To access such services via a home computer the user needs to establish a connection with their service provider, generally via a modem, and check their electronic mailbox to determine if new messages have been received. Because some users connect to their service providers infrequently, messages to these users may not be read in a timely fashion.

Some telephonic voicemail services, on the other hand, can provide notification to a subscriber that voicemail messages are waiting. However, access is limited to voicemail messages received via this system.

BRIEF DESCRIPTION OF THE DRAWINGS

The invention is described with particularity in the appended claims. However, other features of the invention will become apparent and the invention will be best understood by referring to the following detailed description in conjunction with the accompanying drawings in which:

DETAILED DESCRIPTION OF THE PREFERRED EMBODIMENTS

The various embodiments of the present invention yield several advantages over the prior art. In one embodiment, the system and method of the present invention provide a notification to a telecommunication service subscriber of the presence of a data message at a message platform. In other embodiments of the present invention, a signal generated by a security platform is used to trigger the transmission of an indication to the subscriber.

In various embodiments of the present invention the data message platform is a part of a data message network independent from the telecommunications network and its standard suite of services. The present invention provides a coupling between these two networks in order to provide notification over the telecommunications network of activity on the data network—via a different medium.

Figure 1:
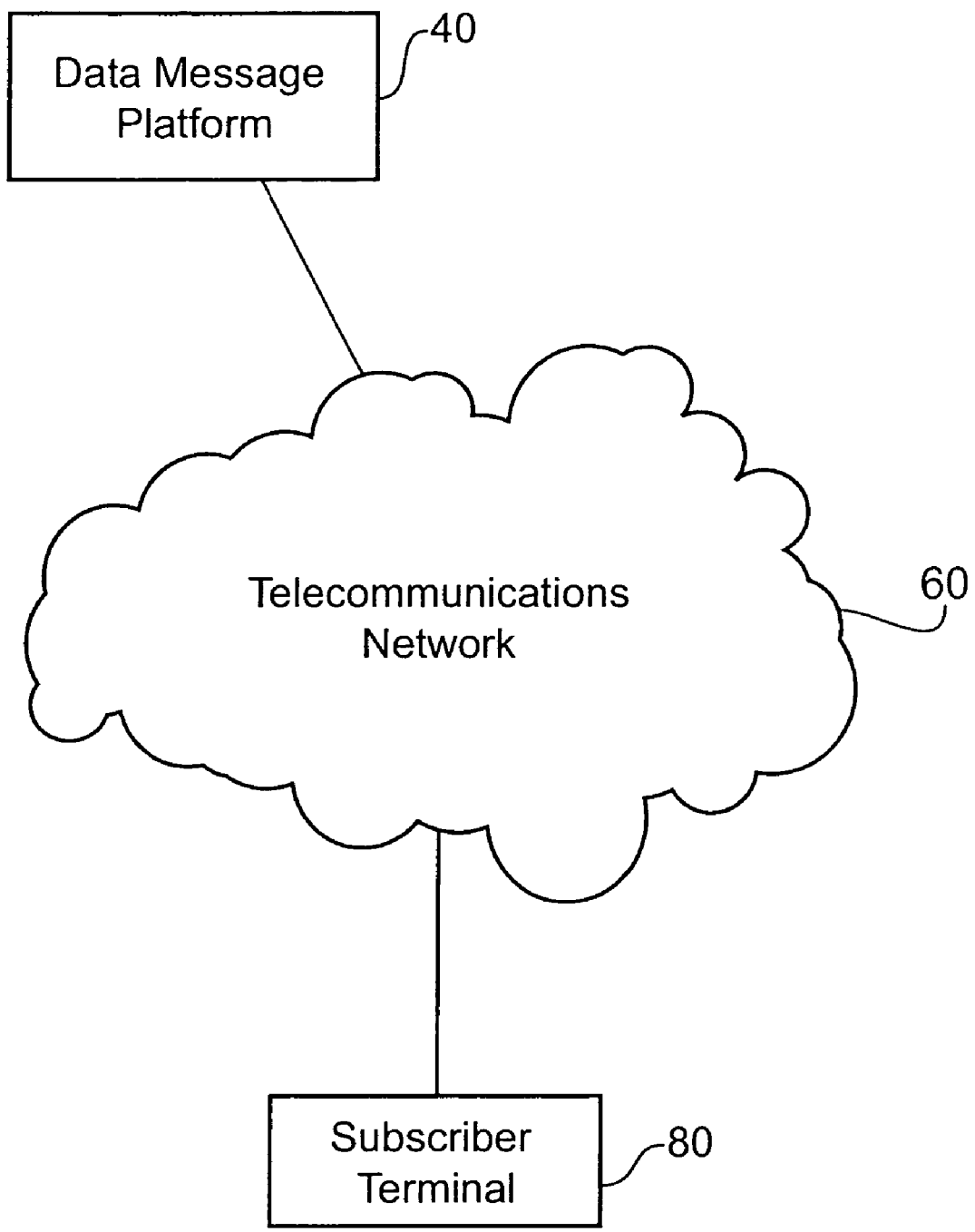
FIG. 1 presents a block diagram representation of a system in accordance with the present invention.

FIG. 1 presents a block diagram representation of a system in accordance with the present invention. A telecommunications network 60 includes at least one subscriber terminal 80 corresponding to at least one subscriber at a subscriber location. The present invention implements a message waiting notification service for indicating the presence of a data message in a data message platform 40 corresponding to the subscriber. The operation of the various components of the present invention will be described in context of the figures that follow.

Figure 2:
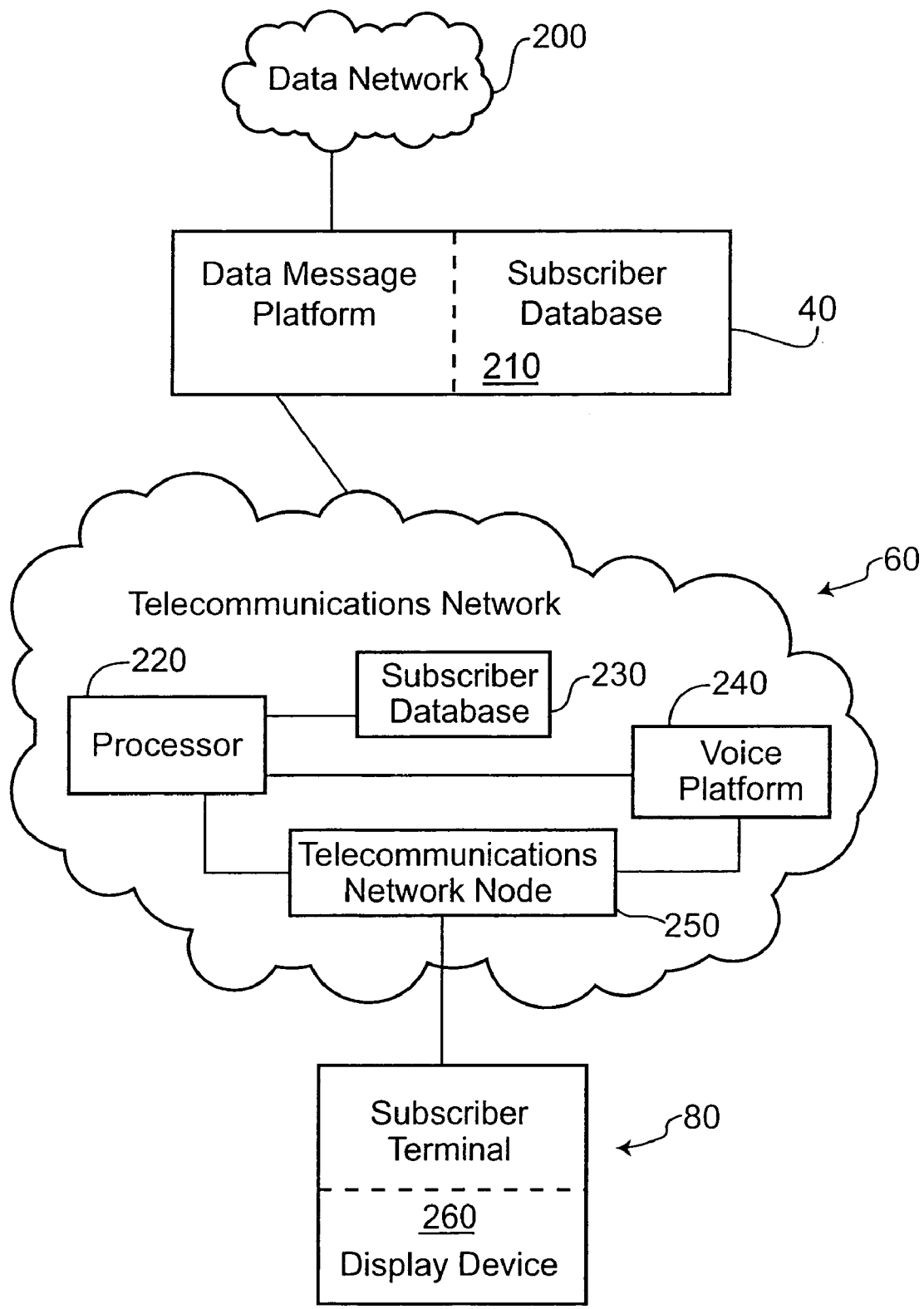
FIG. 2 presents a block diagram representation of a system in accordance with further embodiments of the present invention.

FIG. 2 presents a block diagram representation of a system in accordance with further embodiments of the present invention. Data message platform 40 is coupled to, and is capable of receiving messages from, data network 200. Data message platform 40 includes an optional subscriber database 210 for determining whether a particular subscriber to a data message service is also a subscriber to a message notification service in accordance with the present invention.

Telecommunications network 60 includes a telecommunications network node 250 for coupling to and communication with a plurality of subscriber terminals including subscriber terminal 80. Processor 220 controls selected operations of the telecommunications network 60 and optionally is coupled to subscriber database 230. Voice platform 240 is capable of providing voice signals to subscriber terminal 80 via telecommunications node 250. Subscriber terminal 80 optionally includes a display device 260.

In one embodiment of the present invention, the methods described herein are implemented in an Advanced Intelligent Network (AIN) used by many local exchange carriers and inter-exchange carriers. This provides an efficient and uniform method of implementation for both local and long-distance telecommunication service. In this embodiment, the telecommunications network node can be a central office switch and the processor 220 and subscriber database 230 can be implemented using either a service control point (SCP) of the advanced intelligent network or a service node intelligent peripheral (SNIP) that is further coupled to the network.

Figure 3:
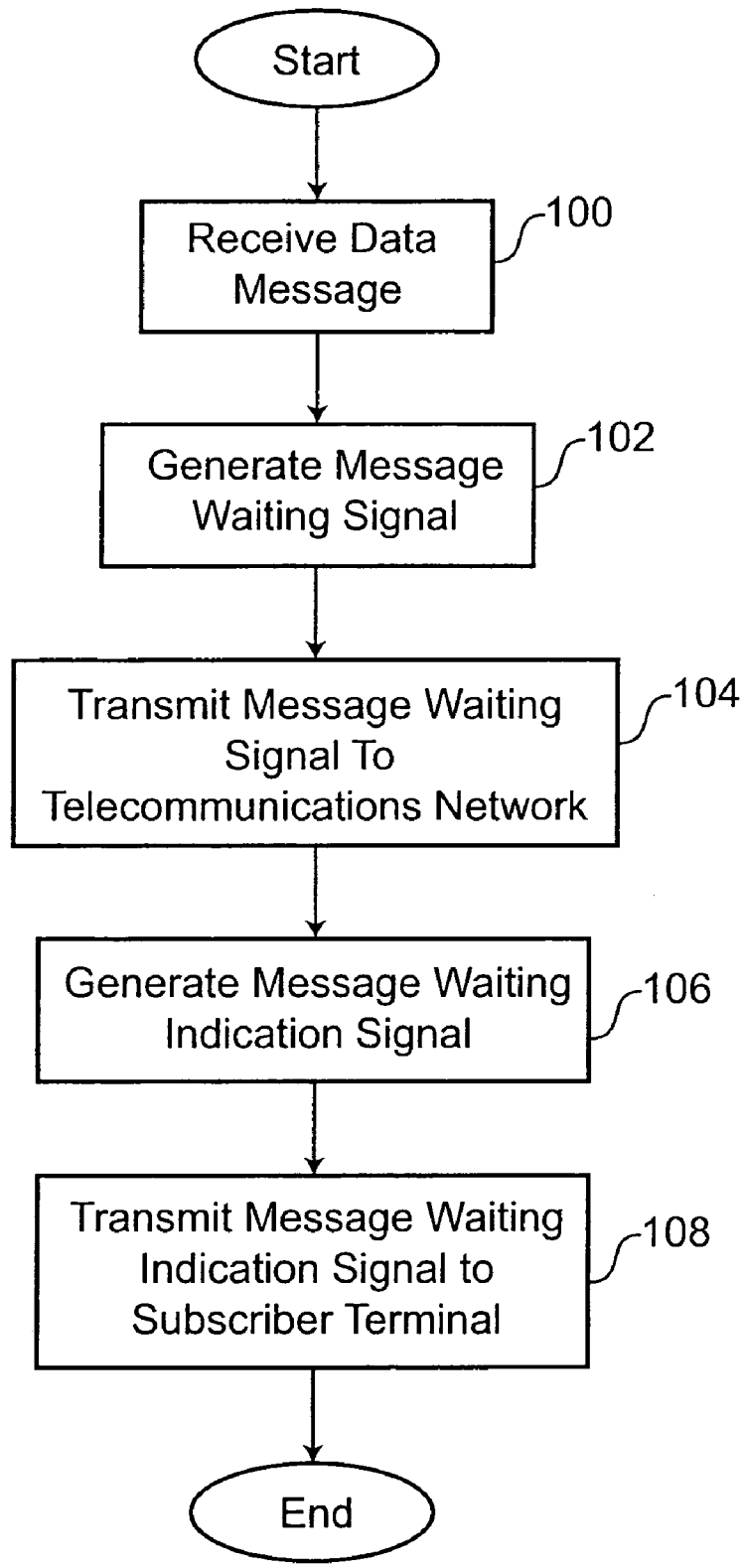
FIG. 3 presents a flowchart representation of a method in accordance with various embodiments of the present invention.

FIG. 3 presents a flowchart representation of a method in accordance with various embodiments of the present invention. The method begins in step 100 by receiving a data message at the data message platform 40. A message waiting signal is generated as shown in step 102. The message waiting signal is transmitted to the telecommunications network 60 as shown in step 104 and a message waiting indication signal is generated at the telecommunications network 60 as shown in step 106. Finally, a message waiting indication signal is transmitted to the subscriber terminal 80 in response to the message waiting signal.

In one embodiment of the present invention, the data message platform 40 is an email server operating in communication with a data network. In operation, when an email message is received, a message waiting signal, such as a data flag, is generated indicating that a message is waiting for the particular subscriber that the email message is addressed to. When the message waiting indication signal is received by the telecommunications network 60, the subscriber's terminal 80 can be notified via the message waiting indication signal.

In various embodiments of the present invention, the subscriber terminal 80 is a telephone with a display device. The message waiting indication signal can take the form of a data signal to the telephone that causes the activation of a message waiting light. Alternatively, other display devices that allow text or graphical data can be used to indicate the presence of a message waiting. For instance, a "email waiting" message can be displayed or a graphical icon representing the same meaning.

In other embodiments, the message waiting indication includes providing a modified dial tone, such as a stutter-dial-tone, to the subscriber terminal 80 in response to an off-hook indication from the subscriber terminal 80 to the telecommunications network 60. When the subscriber picks up the telephone, the stutter-dial-tone is noticeable and the subscriber is alerted to the presence of a data waiting message.

Figure 4:
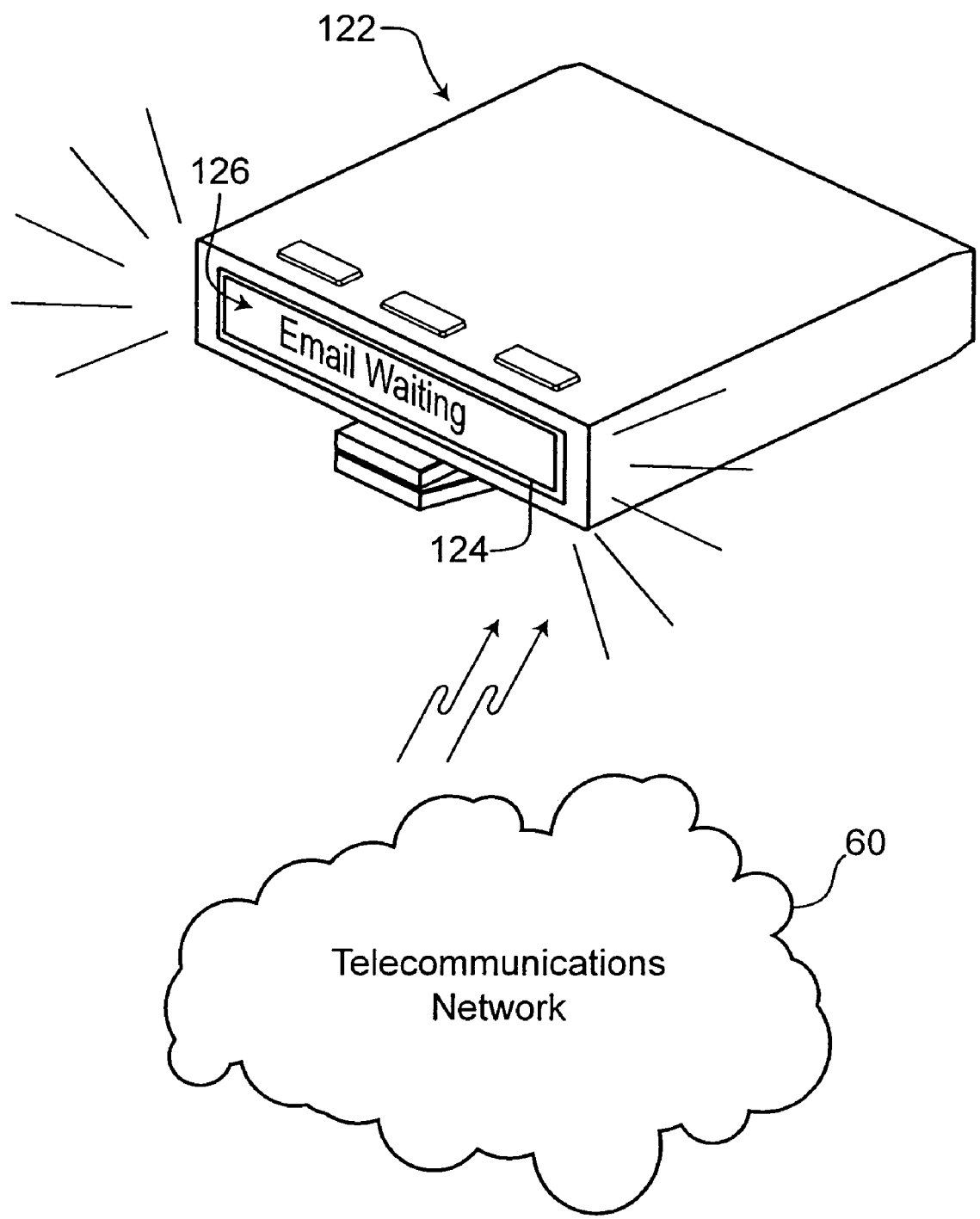
FIG. 4 presents a schematic diagram of the system in accordance with various embodiments of the present invention.

FIG. 4 presents a schematic diagram of the system in accordance with various embodiments of the present invention. In these embodiments, telecommunications network 60 transmits the message waiting indication signal to a subscriber terminal 122 that is a paging device. In one such embodiment, this message waiting indication signal takes the form of a alphanumeric page whose text indicates to a subscriber, via display 124 a text message 126 that says, for example, "email waiting". In a further alternative embodiment, a numeric message can be sent. For example, a particular numeric string such as "1212" or a telephone number uniquely corresponding to the email platform can be used to indicate a email message waiting.

In a further embodiment of the present invention the data message platform 40 is a unit capable of receiving a facsimile message corresponding to the subscriber. In this embodiment, the data message platform 40 is coupled to a network that is capable of transmitting a facsimile message. In one embodiment this network is the POTS network. Alternatively, this network could include a data network such as the internet.

Figure 5:
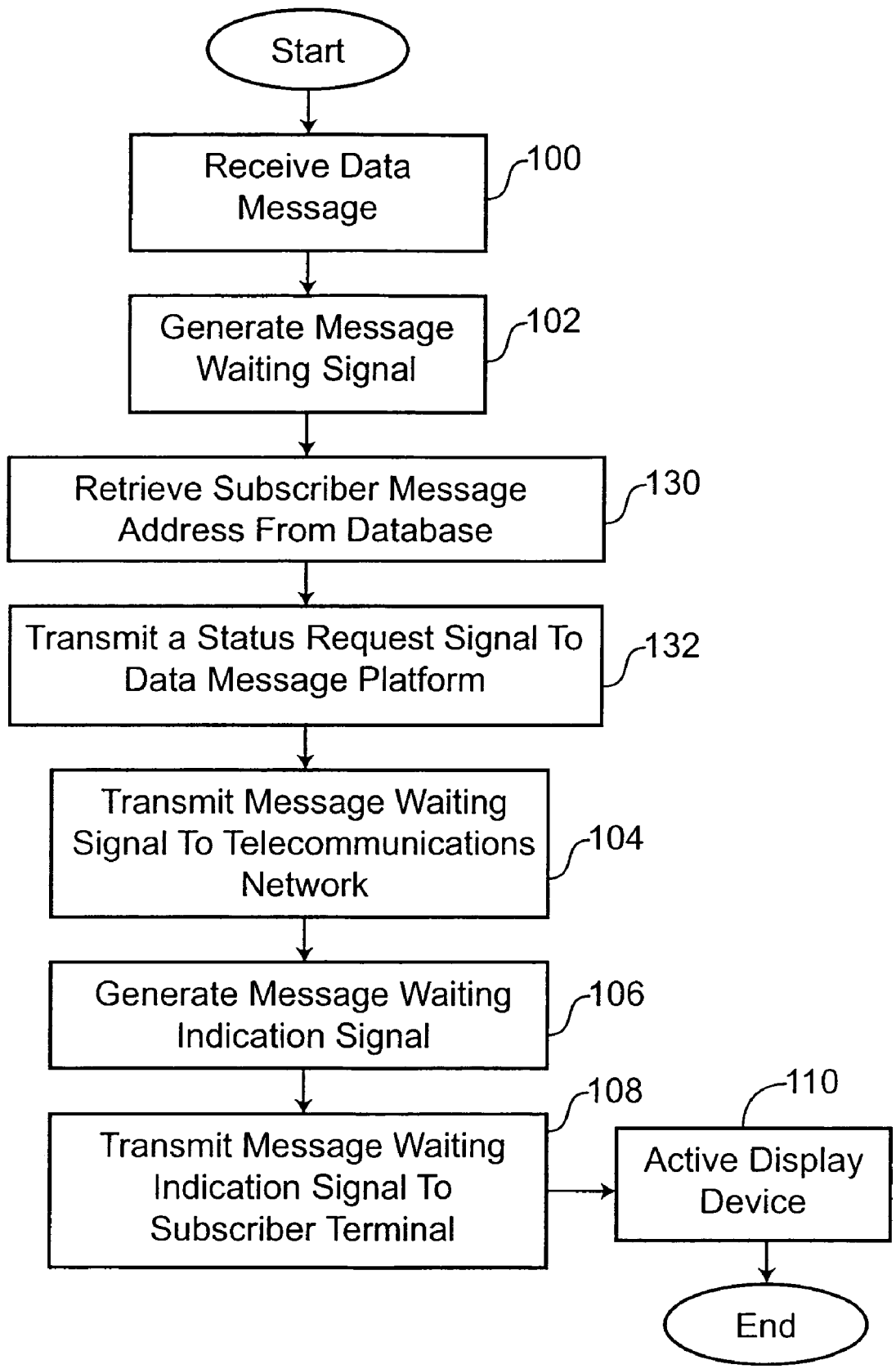
FIG. 5 presents a flowchart representation of a method in accordance with alternative embodiments of the present invention.

FIG. 5 presents a flowchart representation of a method in accordance with alternative embodiments of the present invention. Common reference numerals are used to refer to steps that correspond directly to the steps previously described in conjunction with FIG. 3. In these embodiments, the subscriber to services provided by the telecommunications network must separately subscribe to a message notification service. In this way, it is possible that only a subset of subscribers to the telecommunication network 60 are provided with the message notification service.

In step 130, a subscriber message address is retrieved from a subscriber database for the message notification subscriber. In one embodiment, this database, preferably indexed by the telephone number of the subscriber, includes field entries for the subscriber's message address (such as the subscriber's email address) and optionally a field that indicates if the subscriber is authorized for the service. In step 132, the telecommunications network 60 queries the data message platform 40 to see if messages are waiting for a particular subscriber by transmitting a status request signal from the telecommunications network 60 to the data message platform 40. In the preferred embodiment, this message contains the data address for the subscriber as a means for identifying a particular email-box to the data message platform 40. In response to this message the data message platform 40 determines if messages are waiting for the subscriber by checking the status of the message waiting signal and transmits this information back to the telecommunications network 60 as shown in step 104.

Steps 106 and 108 proceed as previously described in conjunction with FIG. 3. Step 110 reflects the operation of the subscriber terminal 80 of activating its display device in response to the activate message waiting signal received from the telecommunications network 60. As previously described this could entail illuminating a light, displaying an icon, text or numeric message or further could encompass an alternative display method indicative to the subscriber that a message is waiting.

Figure 6:
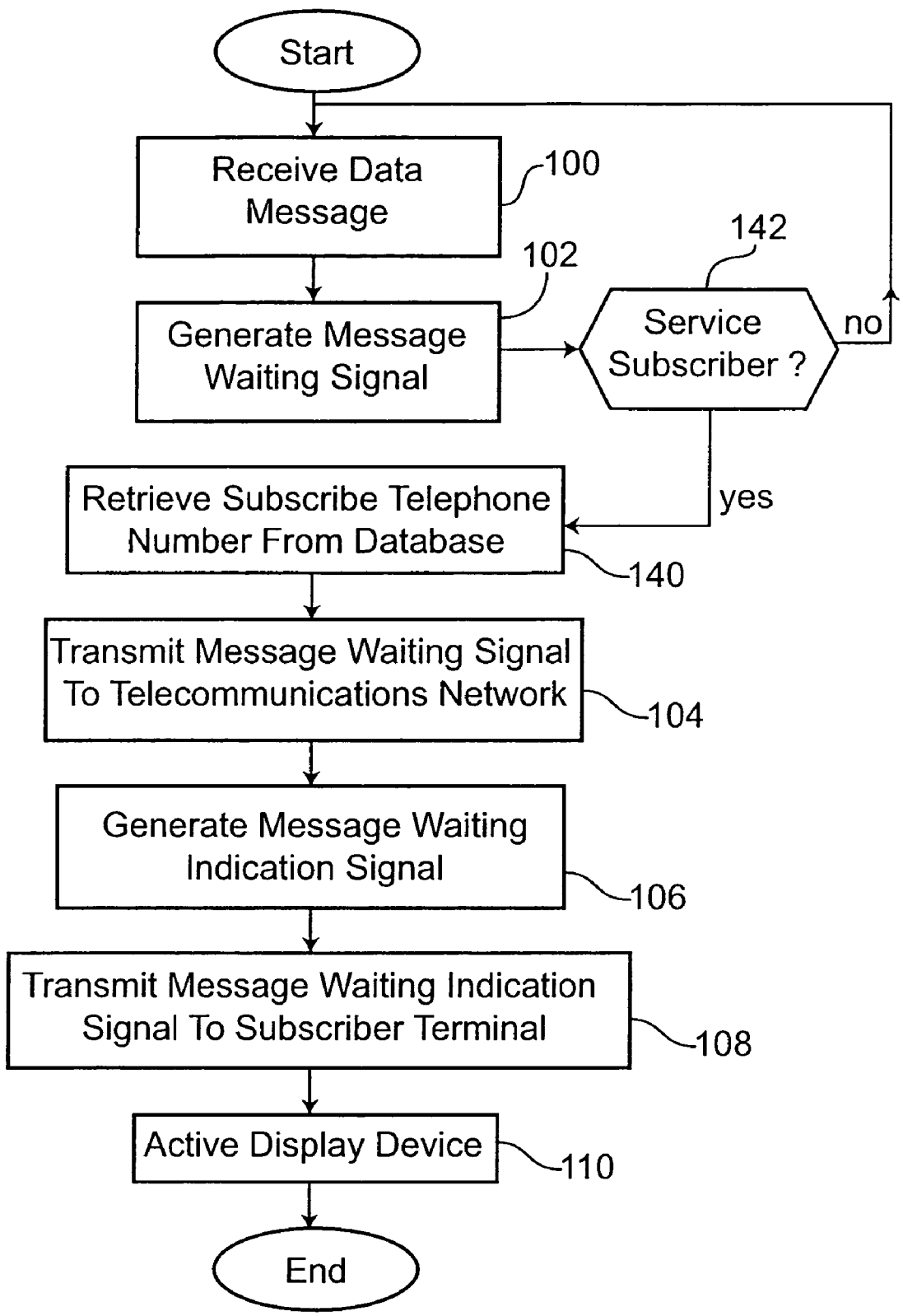
FIG. 6 presents a flowchart representation of a method in accordance with further alternative embodiments of the present invention.

FIG. 6 presents a flowchart representation of a method in accordance with further alternative embodiments of the present invention. Common reference numerals are used to refer to steps that correspond directly to the steps previously described in conjunction with FIGS. 3 and 5. As in the embodiments associated with FIG. 5, the subscriber to services provided by the telecommunications network 60 must separately subscribe to a message notification service. In these embodiments the data message platform 40 includes a subscriber database as described in conjunction with FIG. 5, yet indexed by message address rather than by telephone number.

After a message waiting signal is generated in step 102, the subscriber database is searched to determine if the recipient of the message is a subscriber to the message notification service as shown in step 142. If so, the subscriber's telephone number is retrieved by the data message platform 40 as shown in step 140. Further, a message is transmitted to the telecommunications network 60, preferably including the subscriber's telephone number, indicating that a message is waiting for that particular subscriber.

From the above descriptions in conjunction with FIG. 5 and FIG. 6 it should be evident to one of ordinary skill in the art that in various embodiments of the present invention either the data message platform 40 or the telecommunications network 60 can check to determine if a message corresponds to a subscriber and can cause the transmission of a message waiting signal between the message data platform 40 and the telecommunications network 60.

Figure 7:
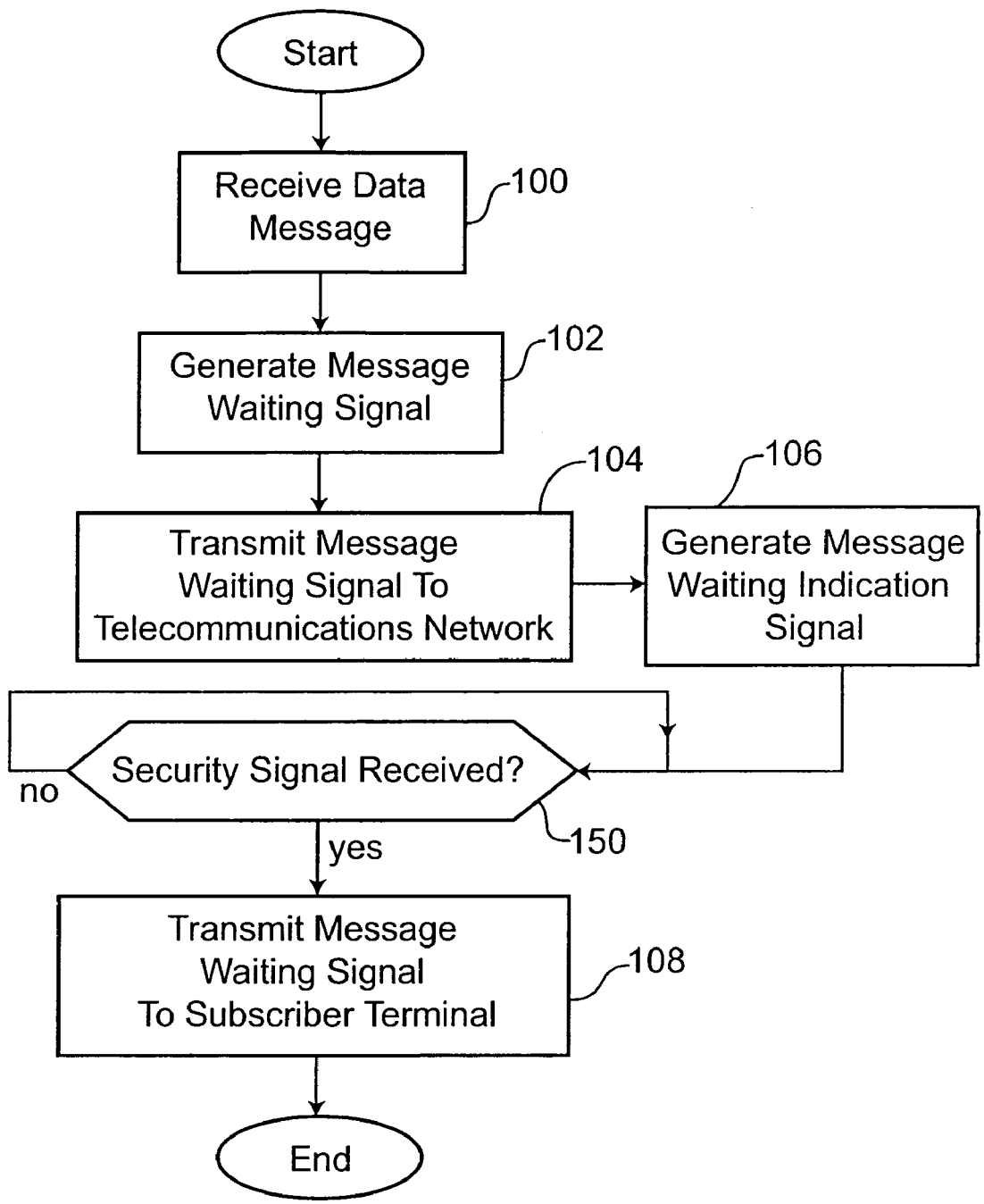
FIG. 7 presents a flowchart representation in accordance with various alternative embodiments of the present invention.

FIG. 7 presents a flowchart representation in accordance with various alternative embodiments of the present invention. Common reference numerals are used to refer to steps that correspond directly to the steps previously described in conjunction with FIGS. 3, 5 and 6. In these embodiments a particular message waiting signal is transmitted to the subscriber terminal 80 only after a security signal is received from a security service platform as shown in decision block 150.

In one such embodiment of the present invention a security platform receives an indication from a security system at the subscriber's location that the subscriber has returned home. An example of such indication would be an activation of a door sensor at the subscriber's location during a period when the alarm is armed followed shortly by a disarming of the system. In response, the security system transmits a disarm signal the security service platform, which in turn, sends a security signal to the telecommunications network 60. This allows the telecommunication network 60 to actively notify a subscriber who has just returned home that one or more data messages are waiting.

In a further embodiment of the present invention, the security signal is forwarded to the telecommunications network only during certain times of day. This can be used to avoid the triggering of a telephone call late at night when the subscriber disarms the system, not in response to returning home, but rather in another event. This embodiment is implemented alternatively by disabling the disarm signal from the security system at the subscriber location or by disabling the generation of the security signal at the security service platform during the selected blackout period.

In a further alternative embodiment of the present invention, the security system at the subscriber location has a security panel for arming and disarming the system that includes message waiting indication on the security panel for indicating the presence of a data message at the data message platform. In this fashion, the security system of the present invention includes the functions of the subscriber terminal in this respect.

Alternatively, the security system at the subscriber location includes a message waiting button and selective activation circuit that, when selected, and when the system is disarmed, triggers the generation of the disarm signal as described above. When the message waiting button is deselected, if the security system is disarmed, no disarm signal is transmitted to the security service platform. In this fashion, the subscriber has control over the activation or deactivation of the feature regardless of the particular time of day.

In one such embodiment, the transmission of the message waiting signal to the subscriber terminal includes a telephone call placed from a voice message platform to the subscriber terminal. If the subscriber answers the call, a voice message can be played to the subscriber verbally indicating the presence of data messages ready to be reviewed.

In a preferred embodiment, the particular method of transmission of a message waiting signal would be supplemented by other methods previously described, such as the illumination of the message waiting light, various displays, either on a telephone or security panel, and paging. Further, these supplemental methods would not be conditioned on the receipt of the security signal, only the placing of the telephone call would be held until the receipt of a security signal from the security platform. In this fashion, the message waiting light would be illuminated, for instance, by transmitting the appropriate message waiting signal immediately in response to the generation of the message waiting indication signal.

Figure 8:
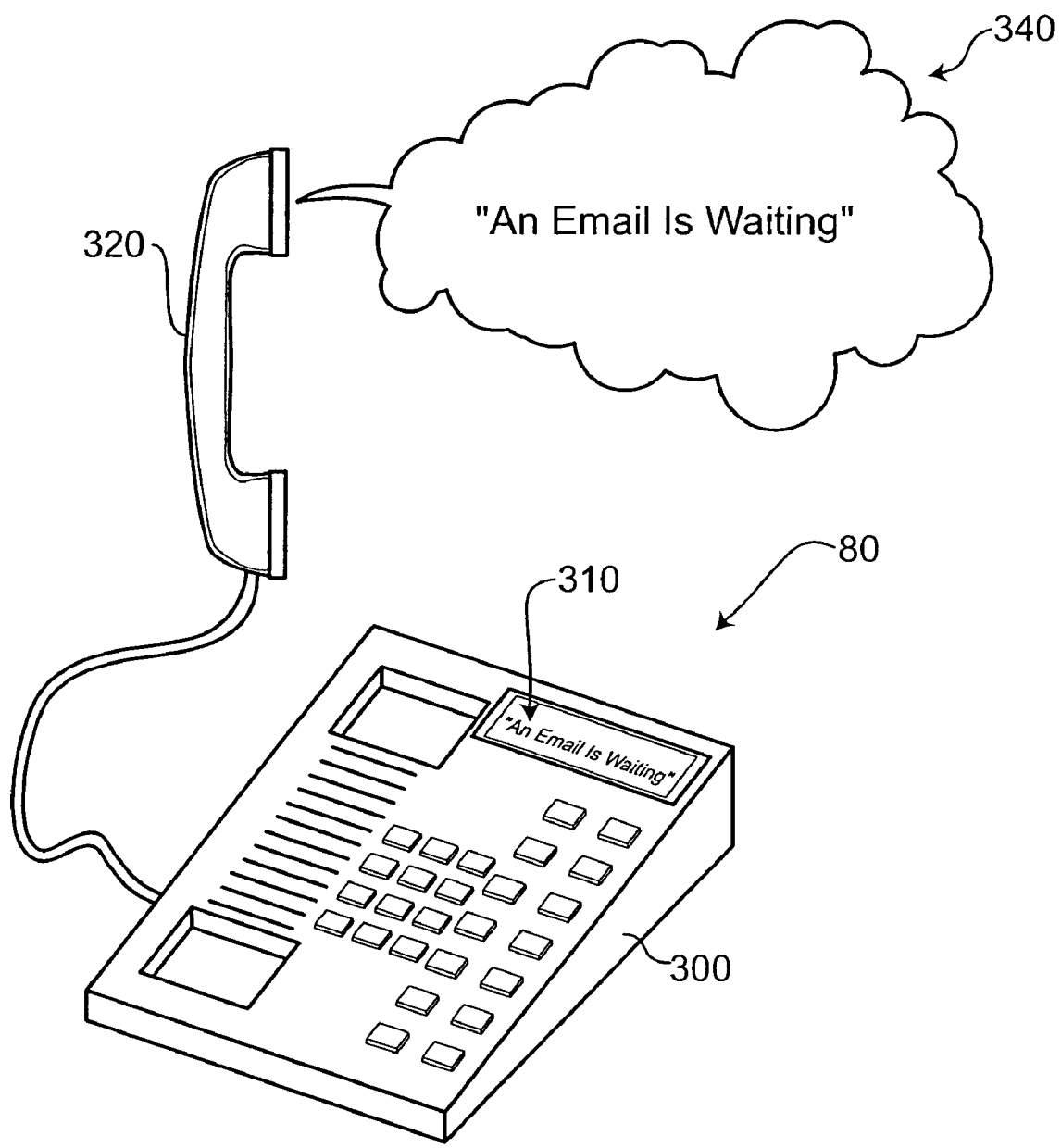
FIG. 8 presents a modified perspective view of a subscriber terminal in accordance with various embodiments of the present invention.

FIG. 8 presents a modified perspective view of a subscriber terminal in accordance with various embodiments of the present invention. In particular, an example implementation is represented in accordance with the inventions described in conjunction with FIG. 7. Subscriber terminal 80 is implemented via telephone set 300 that includes a display device 310. After receipt of a message at an email platform, a message waiting signal is sent to telephone set 300 that results in the display of the message "email waiting" on the display device 310. Further, after the subscriber returns home after a night at the theatre, she enters her house and disarms her home security system. The security system sends a message to a security platform that she is now home. Her home telephone service responds, by placing a telephone call from a voice platform that plays a voice message over handset 320 when she answers the phone that says "an email is waiting".

While various embodiments of the present invention have discussed the use of a telephone for a subscriber terminal 60, a personal computer, acting as a telecommunications device with either speaker and microphone or a supplemental handset, could likewise be used within the scope of the present invention.

The various methods described herein, in a preferred embodiment, are intended for operation as software programs running on a computer processor. One of ordinary skill in the art will recognize that other hardware implementations such as application specific integrated circuits, programmable logic arrays and other hardware devices could likewise be constructed to implement the methods described herein. In should also be noted that the various methods of the present invention could be stored on a tangible storage medium such as a magnetic or optical disk, read-only memory or random access memory and be produced as an article of manufacture.

Thus, there has been described herein a concept, as well as several embodiments including a preferred embodiment, of a method and telecommunication system for providing a message notification service. Because the various embodiments of methods and systems provide notification via a telecommunications network of activity on an independent data message platform, they provide a significant improvement over the prior art. Additionally, the various embodiments of the present invention herein-described have other features that distinguish the present invention from the prior art.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. In a telecommunications network having at least one subscriber terminal corresponding to at least one subscriber at a subscriber location, a message waiting indication service including a method of indicating the presence of an electronic mail message corresponding to the at least one subscriber in a data message platform, the method comprising the steps of:

receiving the electronic mail message at the data message platform;

transmitting a message waiting signal to the telecommunications network after receiving the electronic mail message;

determining if the at least one subscriber is a subscriber to the message waiting indication service; and displaying a message waiting indication that indicates the electronic mail message was received in response to the message waiting signal, only if the at least one subscriber is a subscriber to the message waiting indication service.

2. The method of claim 1 wherein the step of displaying a message waiting indication includes providing a modified dial tone to the subscriber unit in response to an off-hook indication from the subscriber unit to the telecommunications network.

3. The method of claim 1 further comprising the step of: transmitting a status request signal from the telecommunications network to the data message platform to determine if a message is waiting for the at least one subscriber.

4. The method of claim 1 wherein the subscriber terminal includes a pager.

5. The method of claim 1 wherein the subscriber terminal includes a telephone.

6. The method of claim 1 wherein the subscriber terminal includes a personal computer acting as a telecommunications device.

7. The method of claim 1 wherein the step of displaying a message waiting indication includes transmitting an activate message waiting signal to the subscriber unit from the telecommunications network.

8. The method of claim 7 further comprising the step of activating a display device coupled to the subscriber unit in response to the message waiting signal.

9. The method of claim 8 wherein the display device includes a message waiting light.

10. The method of claim 8 wherein the display device includes a text display and wherein the step of activating the display device includes displaying a text message.

11. The method of claim 8 wherein the step of activating includes displaying a message waiting icon.

12. The method of claim 1 further comprising the step of:
in response to a message waiting signal, retrieving from a subscriber database a telephone number corresponding to the at least one subscriber.

13. The method of claim 12 wherein the step of retrieving is performed by the message platform.

14. The method of claim 12 wherein the step of retrieving is performed in the telecommunications network.

15. The method of claim 1 wherein the step of transmitting the message waiting indication signal includes placing a telephone call from a voice message platform to the at least one subscriber terminal.

16. The method of claim 15 wherein step of transmitting the message waiting indication signal includes playing a voice message indicating the presence of a data message corresponding to the at least one subscriber in a data message platform.

17. In a telecommunications network having at least one subscriber terminal corresponding to at least one subscriber at a subscriber location, a system for providing a message waiting indication service for indicating the presence of an electronic mail message corresponding to the at least one subscriber, the system comprising:
a data message platform for receiving the electronic mail message corresponding to the at least one subscriber, for determining if the at least one subscriber is a subscriber to the message waiting indication service, and for transmitting a message waiting signal to the telecommunications network after receiving the electronic mail message, only if the at least one subscriber is a subscriber to the message waiting indication service; and
a display device to display a message waiting indication in response to the message waiting signal, wherein the display indicates the electronic mail message was received.

18. The system of claim 17 wherein the telecommunications network node provides a modified dial tone to the subscriber unit in response to an off-hook indication from the subscriber unit to the telecommunications network.

19. The system of claim 17 wherein the telecommunications network node transmits an activate message waiting signal to the subscriber unit from the telecommunications network.

20. The system of claim 17 wherein the display device includes a message waiting light.

21. The system of claim 17 wherein the display device includes a text display and wherein the step of activating the display device includes displaying a text message.

22. The system of claim 17 wherein the display device displays a message waiting icon.

23. The system of claim 17 wherein the processor transmits a status request signal from the telecommunications network to the data message platform to determine if a message is waiting for the at least one subscriber.

24. The system of claim 17 wherein the message platform includes a subscriber database, and wherein, in response to a message waiting signal, the message platform retrieves, from the subscriber database, a telephone number corresponding to the at least one subscriber.

25. The system of claim 17 wherein the telecommunications network includes a subscriber database, and wherein, in response to a message waiting signal, the processor retrieves, from the subscriber database, a telephone number corresponding to the at least one subscriber.

26. The system of claim 17 wherein the processor determines if the at least one subscriber is a subscriber to the message waiting indication service.

27. The system of claim 17 wherein the subscriber terminal includes a pager and wherein the telecommunications node includes a paging platform.

28. The system of claim 17 wherein the subscriber terminal includes a telephone.

29. The system of claim 17 wherein the subscriber terminal includes a personal computer acting as a telecommunications device.

30. The system of claim 17 further comprising a voice platform for placing a telephone call to at least one subscriber terminal.

31. The system of claim 30 wherein the voice message platform plays a voice message indicating the presence of a data message corresponding to the at least one subscriber in a data message platform.

* * * * *